United States Patent
Da Silva et al.

(10) Patent No.: US 10,314,008 B2
(45) Date of Patent: Jun. 4, 2019

(54) METHODS AND APPARATUS FOR MANAGING PAGING IN A WIRELESS COMMUNICATION NETWORK

(71) Applicant: Telefonaktiebolaget LM Ericsson (publ), Stockholm (SE)

(72) Inventors: Icaro L. J. Da Silva, Solna (SE); Jan Christoffersson, Luleå (SE)

(73) Assignee: Telefonaktiebolaget LM Ericsson (Publ) (SE)

(*) Notice: Subject to any disclaimer, the term of this patent is extended or adjusted under 35 U.S.C. 154(b) by 0 days.

(21) Appl. No.: 15/566,076

(22) PCT Filed: Aug. 16, 2017

(86) PCT No.: PCT/SE2017/050824
§ 371 (c)(1),
(2) Date: Oct. 12, 2017

(87) PCT Pub. No.: WO2018/084761
PCT Pub. Date: May 11, 2018

(65) Prior Publication Data
US 2018/0332561 A1  Nov. 15, 2018

Related U.S. Application Data

(60) Provisional application No. 62/417,614, filed on Nov. 4, 2016.

(51) Int. Cl.
*H04W 68/02* (2009.01)
*H04W 76/27* (2018.01)

(52) U.S. Cl.
CPC ........... *H04W 68/02* (2013.01); *H04W 76/27* (2018.02)

(58) Field of Classification Search
CPC . Y02D 70/1262; H04W 68/025; H04W 76/10
(Continued)

(56) References Cited

U.S. PATENT DOCUMENTS

2007/0153719 A1* 7/2007 Gopal .................. H04W 48/12
370/328
2010/0087210 A1* 4/2010 Lee ...................... H04W 68/00
455/458

(Continued)

FOREIGN PATENT DOCUMENTS

EP   1341390 A1   9/2003
WO  2013007193 A1  1/2013

(Continued)

OTHER PUBLICATIONS

3GPP TSG-RAN WG2 #93bis, Tdoc R2-162760, Title: "Handling of inactive UEs," Source: Ericsson, Agenda Item: 9.2, Document for: Discussion, Decision, Conference Location and Date: Dubrovnik, Croatia, Apr. 11-15, 2016 consisting of 5-pages.

(Continued)

*Primary Examiner* — Kiet M Doan
(74) *Attorney, Agent, or Firm* — Christopher & Weisberg, P.A.

(57) ABSTRACT

There is disclosed a method in a network node of a wireless communications network, the wireless communications network further comprising a terminal device, wherein the terminal device is configurable in a plurality of radio resource control (RRC) states, the plurality of RRC states comprising a first RRC state in which the terminal device is configured with first paging occasions to listen for paging messages from the network node. The method comprises: configuring the terminal device with one or more second paging occasions for the terminal device to listen for paging messages from the network node, in addition to the first paging occasions, while the terminal device is in the first (Continued)

RRC state, responsive to one or more trigger events relating to a transition of the terminal device from the first RRC state or to the first RRC state. Additional methods and apparatus are also disclosed.

24 Claims, 10 Drawing Sheets

(58) Field of Classification Search
USPC ..... 455/458, 450, 552.1, 509, 466; 370/329, 370/216, 312
See application file for complete search history.

(56) References Cited

U.S. PATENT DOCUMENTS

| | | | |
|---|---|---|---|
| 2012/0120858 A1 | 5/2012 | Das et al. | |
| 2014/0256365 A1* | 9/2014 | Schmidt | H04W 4/90 455/466 |
| 2015/0156743 A1* | 6/2015 | Lee | H04W 76/14 455/426.1 |

FOREIGN PATENT DOCUMENTS

| | | |
|---|---|---|
| WO | 2014165338 A1 | 10/2014 |
| WO | 2014182338 A1 | 11/2014 |

OTHER PUBLICATIONS

International Search Report and Written Opinion dated Nov. 13, 2017 for International Application No. PCT/SE2017/050824 filed on Aug. 16, 2017 consisting of 17-pages.

Marsch, Patrick et al. "5G Radio Access Network Architecture: Design Guidelines and Key Considerations" IEEE communications Magazine (vol. 54, Issue: 11), pp. 24-32, Nov. 15, 2016 consisting of 9-pages.

Da Silva, Icaro Leonardo et al. "A novel state model for 5G radio access networks" IEEE International Conference on Communications Workshops (ICC), May 23-27, 2016 consisting of 6-pages.

* cited by examiner

METHODS AND APPARATUS FOR MANAGING PAGING IN A WIRELESS COMMUNICATION NETWORK

CROSS-REFERENCE TO RELATED APPLICATIONS

This Application is a Submission Under 35 U.S.C. § 371 for U.S. National Stage Patent Application of International Application No.: PCT/SE2017/050824, filed Aug. 16, 2017 entitled "METHODS AND APPARATUS FOR MANAGING PAGING IN A WIRELESS COMMUNICATION NETWORK," which claims priority to U.S. Provisional Application No. 62/417,614, filed Nov. 4, 2016, the entirety of both of which are incorporated herein by reference.

TECHNICAL FIELD

Embodiments of the present disclosure relate to methods and apparatus in a wireless communication network, and particularly to methods of managing paging of a wireless terminal device in a wireless communication network.

BACKGROUND

Next generation telecommunications and networking systems are expected to support a wide range of use cases with varying requirements ranging from fully mobile devices to stationary Internet of Things (IoT) or fixed wireless broadband devices. The traffic pattern associated with many use cases for next generation systems is expected to consist of short or long bursts of data traffic with varying length waiting periods between transmissions. For such traffic it is important to optimize the state between the data bursts, often referred to as an inactive state, as well as the transition to active state, in which data transmissions are made.

Small data transmission is of considerable interest as a component of overall traffic pattern, as cumulated small data transmission traffic represents a significant proportion of the overall network traffic, owing in large part to the high market penetration of smartphones. The majority of overhead for small data transmission is the signaling overhead for radio connection setup which is required even before transmission of one small data block. The relatively large overhead for a small data transmission is a common issue for both Long Term Evolution (LTE) and the next generation New Radio Access Technology (NR).

In order to reduce signaling overhead and the associated processing load in the network for small data transmission, Service and System Aspects (SA)2 and Radio Access Network (RAN) Working Groups concluded that a solution for LTE would be introduced in Release 13, the solution allowing a Radio Resource Control (RRC) connection to be suspended and subsequently resumed, thus minimizing the need to go through the full signaling procedure for transitioning from an idle state RRC_IDLE to a connected state RRC_CONNECTED for small data transmissions. The Suspend/Resume procedure is applicable both to normal LTE User Equipments (UEs) and IoT UEs.

The RRC Suspend/Resume procedure is based on enhancements to the RRC_IDLE state making it possible to resume an RRC connection without needing to set the connection up again when the UE returns from an idle state, assuming that a majority of the time, a UE will return to connected state in a cell serviced by a node which has stored the RRC context for the UE. The RRC Suspend/Resume procedure uses a UE RRC context, also referred to as an Access Stratum (AS) context. The UE RRC context is stored both in the RAN and in the UE. When a UE initiates an RRC Resume procedure, for example to transmit small data, the eNB receiving the RRC Resume Request will either have the context available or will fetch it from another node where it was stored when the UE was suspended. The UE RRC context or AS Context contains information needed for the UE and network to resume the RRC connection. This includes security parameters such as encryption keys, parameters for Signaling Radio Bearers (SRBs) and Data Radio Bearers (DRBs) (Packet Data Convergence Protocol (PDCP) and Radio Link Control (RLC) configurations) and measurement configurations.

The RRC Suspend/Resume procedure is illustrated in FIG. 1 between a UE and an eNodeB (eNB). Referring to FIG. 1, the procedure starts with a Random Access request. This is partly required as the Uplink (UL) synchronization cannot be guaranteed as a result of UE inactivity (that is the suspension of the RRC connection) and the fact that the UE may have moved to a new position, requiring adjustment of the timing offset for UL synchronization, or may have moved to a new cell or tracking area.

Upon reception of Random Access Channel (RACH) preamble, the eNB sends a Re-activation Request (RAR) message include a timing advance (TA) value for UL timing and a grant for SRB0, which is needed for the RRC connection re-activation request transmission. The SRB0 is used to carry Common Control Channel (CCCH) signaling, without the support of security functionalities as is required for other types of SRBs and DRBs.

When the RRC connection re-activation request message is successfully transmitted to the UE (RRCConnectionResumeRequest, according to TS 36.331) the UE will activate its RRC context. From this point in the procedure, SRBs and DRBs are encrypted, as the activated UE RRC context contains configuration parameters for SRBs and DRBs (PDCP/RLC parameters), encryption keys and measurement configurations. The eNB also activates the UEs RRC context and replies with an RRC connection re-activation message to the UE (RRCConnectionResume). This message may also include grants for the DRB used for data transmission. Upon receiving this message the UE enters the RRC_CONNECTED state.

Finally, the UE responds with an RRC connection re-activation complete message and the UE is then ready for UL data transmission. When the UE has finished its transmission there will be signaling to in-activate the UEs RRC context and send the UE back to an inactive state again. This signaling may for example be triggered if the UE is inactive for a certain period of time.

It has been agreed that in the next generation NR there will be an inactive "state" with the following characteristics:
 a/ CN/RAN connection is maintained
 b/ AS context is stored in the RAN
 c/ Network knows a UE's location within an area and the UE performs mobility within that area without notifying the network.
 d/ RAN can trigger paging of UEs which are in the RAN controlled "inactive state"
 e/ No dedicated resources In LTE Release 14, under the RRC light connection working item, the solution based on Suspend/Resume described above and illustrated in FIG. 1 appears to be evolving in the same direction as the NR inactive state, with very similar characteristics also being assumed for the UE when the RRC context is suspended. This is illustrated in FIG. 2.

In recent work, progress has been made on UE state assumptions for NR. It has been agreed that an "inactive" state will be introduced, in which a UE should be able to start data transfer with low delay (as dictated by RAN requirements). One of the open issues concerned data transmission when UEs are in the "inactive" state, with the question of whether data transfer is accomplished by the UE leaving the inactive state or can take place with the UE in the inactive state being held over for further study. This question has now been partially resolved, with agreement that in the inactive state there will be a mechanism where the UE first transitions to the full connected state in which data transmission can occur. However, for the special case of small data transmissions, a possibility for the UE to perform data transmission without state transition from the inactive state to the connected state is considered.

SUMMARY

Embodiments of the present disclosure provide methods and apparatus addressing problems in the management of paging in a wireless communication network.

In one aspect, the disclosure provides a method in a network node for a wireless communications network. The wireless communications network comprises a terminal device, which is configurable in a plurality of radio resource control (RRC) states, the plurality of RRC states comprising a first RRC state in which the terminal device is configured with first paging occasions to listen for paging messages from the network node. The method comprises: configuring the terminal device with one or more second paging occasions for the terminal device to listen for paging messages from the network node, in addition to the first paging occasions, while the terminal device is in the first RRC state, responsive to one or more trigger events relating to a transition of the terminal device from the first RRC state or to the first RRC state.

Another aspect of the disclosure provides a network node configured to carry out the method recited above.

A further aspect provides a network node for a wireless communications network. The wireless communications network comprises a terminal device, which is configurable in a plurality of radio resource control (RRC) states, the plurality of RRC states comprising a first RRC state in which the terminal device is configured with first paging occasions to listen for paging messages from the network node. The network node comprises processing circuitry and a computer-readable medium. The computer-readable medium stores code that, when executed by the processing circuitry, causes the network node to: configure the terminal device with one or more second paging occasions for the terminal device to listen for paging messages from the network node, in addition to the first paging occasions, while the terminal device is in the first RRC state, responsive to one or more trigger events relating to a transition of the terminal device from the first RRC state or to the first RRC state.

Another aspect of the disclosure provides a network node for a wireless communications network. The wireless communications network comprises a terminal device, which is configurable in a plurality of radio resource control (RRC) states, the plurality of RRC states comprising a first RRC state in which the terminal device is configured with first paging occasions to listen for paging messages from the network node. The network node comprises: a first module operable to configure the terminal device with one or more second paging occasions for the terminal device to listen for paging messages from the network node, in addition to the first paging occasions, while the terminal device is in the first RRC state, responsive to one or more trigger events relating to a transition of the terminal device from the first RRC state or to the first RRC state.

A yet further aspect of the disclosure provides a method in a terminal device for a wireless communications network. The wireless communications network comprises a network node. The terminal device is configurable in a plurality of radio resource control (RRC) states, the plurality of RRC states comprising a first RRC state in which the terminal device is configured with first paging occasions to listen for paging messages from the network node. The method comprises: being configured with one or more second paging occasions responsive to one or more trigger events relating to a transition of the terminal device from the first RRC state or to the first RRC state; and, while in the first RRC state, listening for paging messages from the network node during the one or more second paging occasions in addition to the first paging occasions.

Another aspect provides a terminal device configured to carry out the method recited above.

A further aspect provides a terminal device for a wireless communications network. The wireless communications network comprises a network node. The terminal device is configurable in a plurality of radio resource control (RRC) states, the plurality of RRC states comprising a first RRC state in which the terminal device is configured with first paging occasions to listen for paging messages from the network node. The terminal device comprises processing circuitry and a computer-readable medium. The computer-readable medium stores code that, when executed by the processing circuitry, causes the terminal device to: be configured with one or more second paging occasions responsive to one or more trigger events relating to a transition of the terminal device from the first RRC state or to the first RRC state; and while in the first RRC state, listen for paging messages from the network node during the one or more second paging occasions in addition to the first paging occasions.

Another aspect provides a terminal device for a wireless communications network. The wireless communications network comprises a network node. The terminal device is configurable in a plurality of radio resource control (RRC) states, the plurality of RRC states comprising a first RRC state in which the terminal device is configured with first paging occasions to listen for paging messages from the network node. The terminal device comprises: a first module operable to be configured with one or more second paging occasions responsive to one or more trigger events relating to a transition of the terminal device from the first RRC state or to the first RRC state; and a second module operable to, while in the first RRC state, listen for paging messages from the network node during the one or more second paging occasions in addition to the first paging occasions.

A further aspect provides a method in a wireless communication network. The wireless communication network comprises a first network node and a terminal device. The terminal device is configurable in a plurality of radio resource control (RRC) states. The plurality of RRC states comprise a first RRC state in which the terminal device is configured with first paging occasions to listen for paging messages from the first network node. The method comprises: configuring the terminal device with one or more second paging occasions for the terminal device to listen for paging messages from the first network node, in addition to the first paging occasions, while the terminal device is in the first RRC state responsive to one or more trigger events relating to a transition of the terminal device from the first RRC state or to the first RRC state.

DETAILED DESCRIPTION

Figure 1:
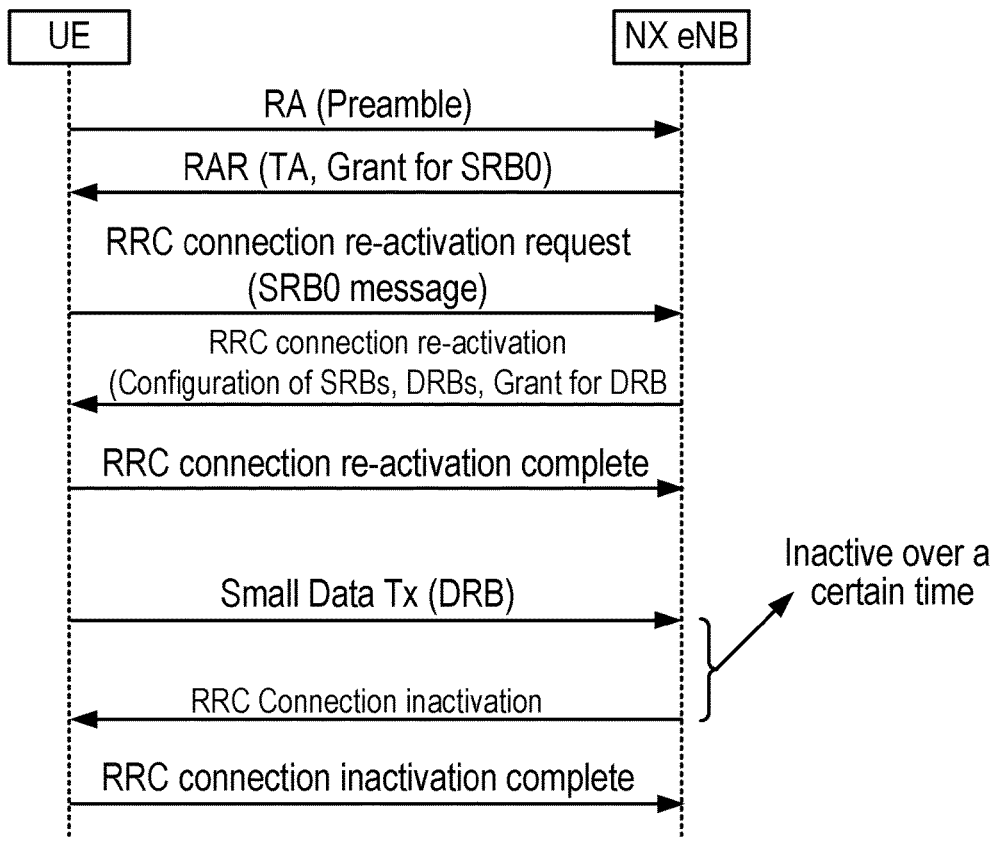
FIG. 1 is a signaling diagram illustrating an RRC Resume procedure.
Figure 2:
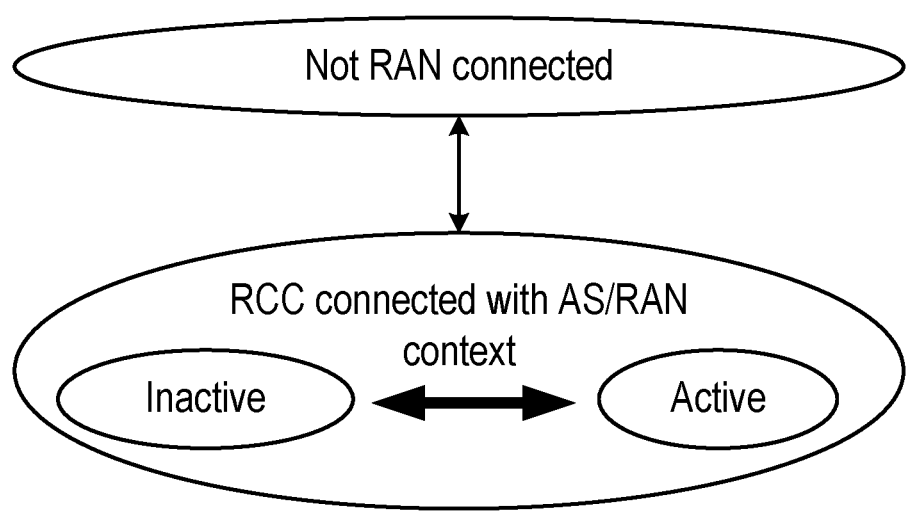
FIG. 2 is a representation of RRC states.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Figure 3:
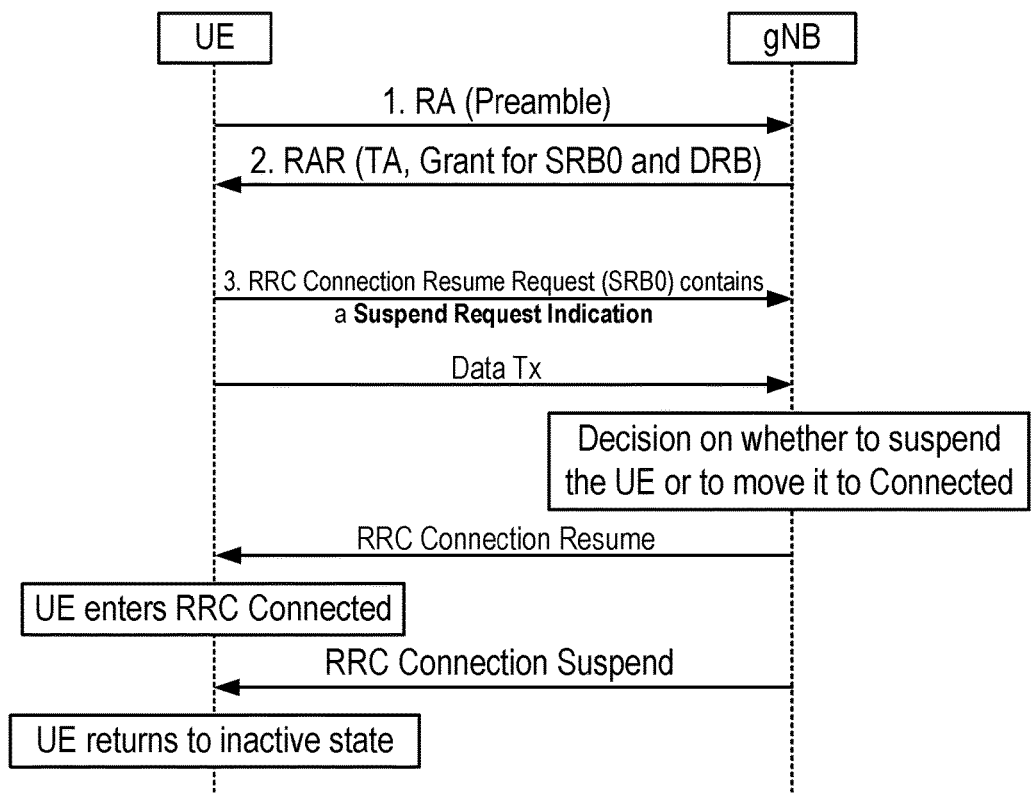
FIG. 3 is a signaling diagram illustrating a procedure for sending small data transmissions.

A first mechanism for data transmission by a UE without state transition, as envisaged for the new RRC inactive state, comprises transmitting data in conjunction with message 3 of the RRC Suspend/Resume procedure illustrated in FIG. 1, i.e. together with the RRC Connection Re-activation Request. The main steps of this mechanism are illustrated in FIG. 3 and outlined below.

The Random access response message (message 2) contains a grant large enough to allow the UE to transmit both the RRC Connection resume request and a small data packet.

Small data transmission is a technical concept under study by the 3GPP and involved companies. For the purposes of the following discussion and the disclosure hereinafter, a small data transmission comprises a transmission by a UE that follows a small data transmission procedure. A small data transmission procedure comprises a procedure used by UEs in an Inactive state which have an amount of data to transmit which is less than some threshold amount. The precise threshold for the amount of data may vary widely according to different applications, situations and use cases. The procedure may allow a UE to send the data without first transitioning to a Connected state. The Connected state is the RRC Connected state, and the Inactive state may be either a newly defined state RRC_INACTIVE, as discussed above, or may be the Suspended mode of the state RRC_IDLE.

If the UE has only one small packet to transmit, signaling may be further simplified, with the UE possibly not needing to activate the entire RRC context. For example, initiating DL measurements may be unnecessary when transmitting only a single small UL packet.

The small data could be sent simultaneously (that is, multiplexed on the same Transport Block (TB)) with the RRC Connection resume request that activates the context (message 3). The data transmission could be sent on a shared/contention based, and always active, DRB.

If the UE has only one small packet to transmit, the context could be deactivated immediately after the transmission or after a timer expiration without any extra deactivation signaling. The RRC response also serves as a contention resolution message, i.e. acknowledging the successful reception of the packet.

In addition to reducing first packet latency, one advantage of this type of solution is the efficient support for infrequent transmissions. A UE could also indicate in the RRCConnectionResumeRequest message that the UE wishes immediately to return to the inactive state instead of moving to the connected state, as is the case in the procedure of FIG. 1. Remaining in the inactive state is sensible if these small transmissions are also infrequent. If there are long time gaps between transmissions then it is inefficient to move the UE to the connected state, wait for some inactivity timer to expire and then move the UE back to the inactive state. With no subsequent data transmissions during the inactivity timer, there is no advantage to be gained from placing the UE in the connected state, and during this time the UE would be performing connected state procedures, including measurements and reporting, which consume UE battery.

In the procedure discussed above and illustrated in FIG. 3, the UE starts with a random access procedure but the data included with message 3 is transmitted over an orthogonal scheme (e.g. PUSCH/PUCCH) thanks to the UL grants provided by the eNB. An alternative procedure would be to use a Contention-Based (CB) channel to directly send data with message 3 (possibly including on this channel the indication that the UE wishes to immediately return to the inactive state. In this case the UE either needs to be pre-configured as to how to use the CB channel or to read the configuration via system information. Another alternative procedure would be for the UE to transmit infrequent small data directly on a CB channel without any RRC signaling. A CB channel would therefore be defined that can be used for small infrequent data and that UEs can access in the inactive state.

In RRC Connected, the network has a better control of the resources being used, compared to the case of UEs in RRC_Inactive and/or RRC_Idle. In addition to that, in Connected mode the network can properly apply quality of service (QoS) treatment of the different flows/UEs, perform link adaptation, beam management, session continuity, etc. Therefore, from a resource-efficiency perspective, it is more beneficial to the network to keep the UEs in RRC_Connected mode instead of RRC_Inactive when data transmissions are frequent.

On the other hand, in case of very infrequent traffic, it is more efficient to let the UE reside in an inactive state. Hence there is always a question of whether to put the UE into RRC_Connected or RRC_Inactive (or RRC_Idle) mode.

In RAN2#95bis, one of the agreed design questions that the small data transmission solution needs to address is how downlink acknowledgements (e.g. from higher layer protocols) are addressed. In order to ensure reliability, it is quite likely that acknowledgement of UL transmissions may need to be provided on many layers e.g. HARQ, RLC, TCP and the Application layer. If the UE immediately returns to the RRC_Inactive state after an UL transmission (i.e. multiplexed with or following the RRCConnectionResumeRequest message in FIG. 3), these acknowledgments would trigger paging and lead to significant inefficiencies. For example, there may be a long delay until the DL data can be delivered, since the paging occasions, i.e. the time instances when paging messages can be sent to the UE, are typically configured at relatively long intervals to enable power saving in the UE. Further, there may be additional signaling overhead due to the RRC signaling needed to put the UE back into RRC_Connected mode in order to receive the acknowledgement messages.

What complicates things further is the fact that, when it is necessary to decide whether to configure the UE in RRC_Inactive (i.e. suspend the RRC connection) or RRC_Connected, the network may not know the amount of traffic that will follow in the downlink. The network has to make this decision after only receiving message 3 (i.e. the RRCConnectionResumeRequest message) and the first small UL data.

In some cases, this first transmission may contain a buffer status report (BSR) indicating that the UE has more data than that which can be transmitted in the first transmission; however, even that information is insufficient to know with certainty what data will follow in DL and whether this first packet will trigger additional UL/DL traffic. Hence, at the time the network has to make the decision on whether to put the UE into connected or inactive mode, it may have very limited knowledge as to which decision is optimal.

According to embodiments of the disclosure, methods, apparatus and networks are provided in which a wireless terminal device (i.e. a UE) in a first RRC state is configured with paging occasions that are additional to the paging occasions otherwise defined for that RRC state. The additional paging occasions may be triggered by a trigger event such as the wireless terminal device transitioning to the first RRC state (or being instructed to do so), or the wireless terminal device transitioning from the first RRC state in order to transmit a data packet (e.g. a small data packet as defined above). The additional paging occasions may be valid for a certain time window T commencing with the trigger event. After the time window has expired, the wireless terminal device is not configured with the additional paging occasions and instead relies on the paging occasions that are otherwise defined for the RRC state.

The solution outlined above allows the network to respond more rapidly in unpredictable scenarios when a wireless terminal device has just entered or left a particular RRC state (such as RRC_Inactive). When DL data is required or becomes available soon after such a state transition, the additional paging occasions configured for the wireless terminal device allow the network to page the device with reduced latency than would otherwise be the case.

For example, the additional paging occasions may be configured with respect to a paging cycle (i.e. with one paging occasion per cycle). The additional paging cycles may be configured to be short (i.e. shorter than corresponding paging cycles that would otherwise be provided in RRC_Inactive) to reduce the possible delay in case there is DL traffic following the first UL transmission(s). The short paging cycles may be triggered by the small data transmitted together with message 3, or following message 3 ("Data Tx").

Although the concepts outlined herein are applicable in a number of different scenarios, two particular use cases are outlined below as examples. In the first use case, a wireless terminal device follows the procedure outlined in FIG. 3 for transmitting a small data packet while in the RRC_Inactive state (i.e. waking from the RRC_Inactive state temporarily to transmit the small data packet before reverting to the RRC_Inactive state).

Thus, in the first step the UE uses a small data transmission procedure to transmit a small data packet together with message 3 (RRCConnectionResumeRequest), or shortly after message 3 ("Data Tx").

The network must then make a decision on how to handle this UE, i.e. whether to suspend the RRC connection of the UE (i.e. so that it reverts to RRC_Inactive mode), or to move it to a connected mode (i.e. RRC_connected).

1. If, for example, the UE has indicated that there is more UL data coming (i.e. the UE has provided a BSR indicating more UL data) and/or the network predicts, based on previous UE behaviour for this UE, that the UL small data transmission will trigger more activity in UL and/or DL, the network orders the UE into RRC_Connected mode (i.e. transmits a RRCConnectionResume message) in the RRC response in message 4.

2. If, for example, the UE does not indicate that there is more UL data coming (i.e. no BSR is provided, or a BSR is provided indicating that there is no further data to be transmitted) and/or the network predicts, e.g. based on previous UE behavior for this UE, that this UL small data transmission will not trigger more activity in UL and/or DL, the network orders the UE back to RRC_Inactive mode (i.e. transmits an RRCConnectionSuspend message) in the RRC response in message 4.

3. If, for example, the UE does not indicate whether there is more UL data coming (e.g. no BSR is provided) and/or the network cannot make a confident prediction of whether there is any DL data to be expected, according to embodiments of the disclosure, the network may order the UE back to RRC_Inactive mode (i.e. transmits an RRCConnectionSuspend message) in the RRC response in message 4, but may additionally configure the UE with additional paging occasions to be applied within a limited time period after the RRC suspend message. The network response in message 4 (i.e. RRCConnectionSuspend message) may contain configuration parameters for the additional paging occasions. For example, the configuration parameters may comprise one of more of: the cycle length (i.e. measured in units of time, such as milliseconds, frames, or subframes etc) and how long the additional paging occasions are valid for (i.e. before the UE reverts to longer cell-configured paging cycles). The latter parameter may also be measured in units of time, or in numbers of cycles, for example. Alternatively, the additional paging cycles may be broadcasted in system information by a network node. This latter embodiment reduces the signaling of parameters that would otherwise be required.

After applying step 3 above (and particularly after the limited time window has expired), the UE returns to the ordinary paging cycles configured for the cell.

If a network node determines that there is DL data to be transmitted to the UE, while the UE is configured with the additional paging occasions (e.g. within the limited time window in which the additional paging occasions apply), smart paging may be utilized to reduce the amount of signaling required in the network. For example, a paging message may be transmitted for the UE only in the cell where the UE was previously transmitting), as it may be assumed that the UE will not have been to camp on other cells within the short time frame since its small data transmission in message 3.

A second use case is when the UE is in the RRC_Connected state, and an inactivity timer expires so that the RRC connection is suspended and the UE moves to RRC_Inactive state (or equivalent such as light connected and/or Idle and/or any other dormant state optimized for power savings). The transition from RRC_Connected to RRC_Inactive may act as a trigger event for the UE to be configured with additional paging occasions for a limited period of time following the transition, e.g. substantially as described above with respect to step 3 of the first use case. The applicability in this use case is that it may be difficult to predict whether DL packets will be required after the UE moves to an inactive state. By configuring the UE with additional paging occasions, the latency in paging the UE for such unpredictable packets is reduced.

As with use case 1, the RRCConnectionSuspend message may contain one or more configuration parameters comprising one of more of: the cycle length (i.e. measured in units of time, such as milliseconds, frames, or subframes etc) and how long the additional paging occasions are valid for (i.e. before the UE reverts to longer cell-configured paging cycles). The latter parameter may also be measured in units of time, or in numbers of cycles, for example. Alternatively, the additional paging cycles may be broadcasted in system information by a network node. This latter embodiment reduces the signaling of parameters that would otherwise be required.

If a network node determines that there is DL data to be transmitted to the UE, while the UE is configured with the additional paging occasions (e.g. within the limited time window in which the additional paging occasions apply), smart paging may be utilized to reduce the amount of signaling required in the network. For example, a paging message may be transmitted for the UE only in the cell where the UE was previously transmitting), as it may be assumed that the UE will not have been to camp on other cells within the short time frame since its small data transmission in message 3.

Figure 4:
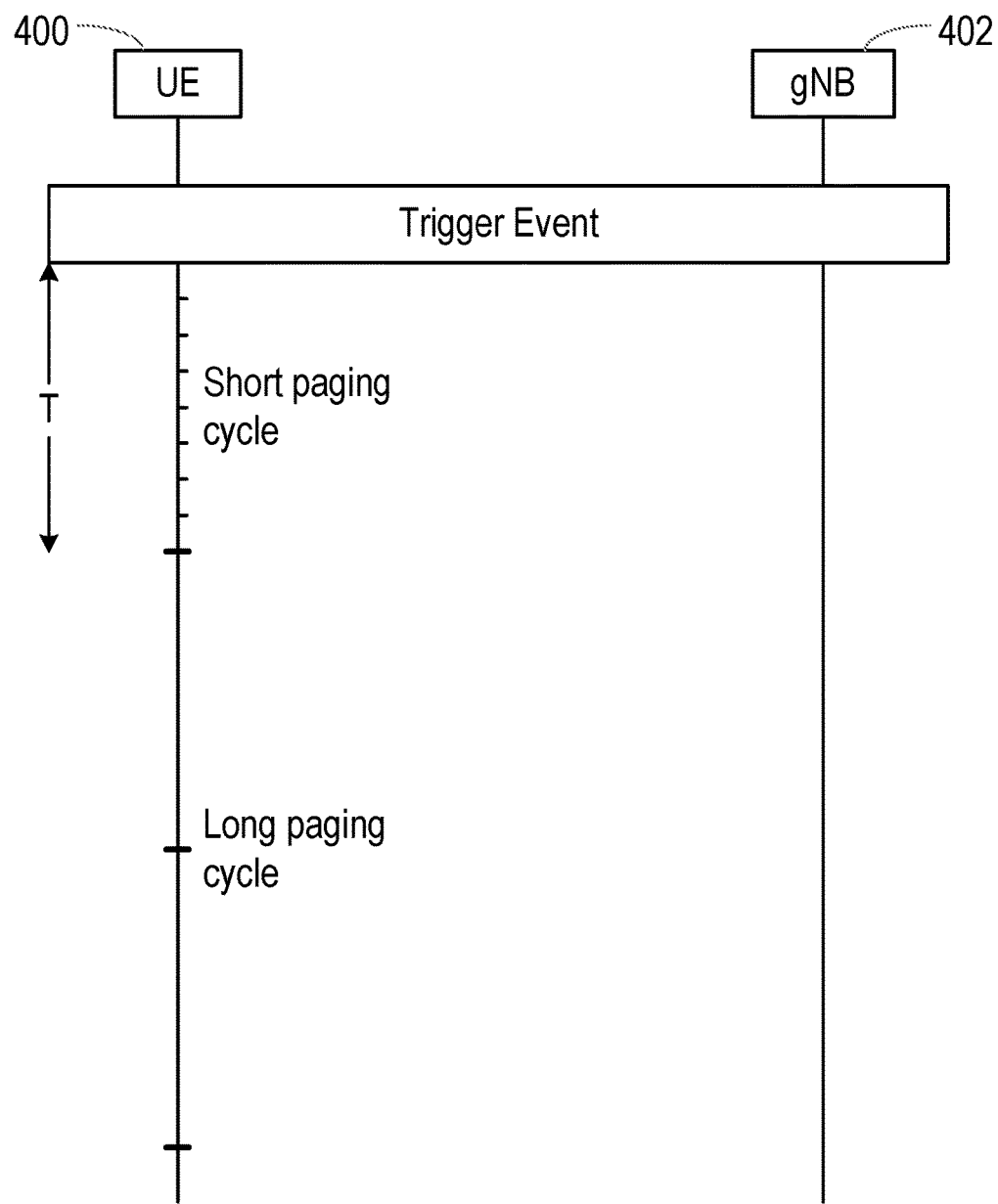
FIG. 4 is a signaling diagram according to embodiments of the disclosure.

FIG. 4 is a signaling diagram according to embodiments of the disclosure, showing the additional paging occasions, for a UE 400 and a gNB 402 (or other network node, such as a radio access node).

A trigger event is first detected in either the UE 400, the gNB 402, or both, causing the UE 400 to be configured with additional paging occasions. The trigger event may be one of a plurality of trigger events that all cause the UE 400 to be configured with additional paging occasions. Alternatively, a single type of trigger event may cause the UE 400 to be configured with additional paging occasions.

For example, one or more trigger events may relate to a transition of the terminal device from a first RRC state or to the first RRC state (e.g. RRC_Inactive). One of the trigger events may comprise a transition of the terminal device from a second RRC state to the first RRC state (i.e. a transition from RRC_Connected to RRC_Inactive), e.g. due to Tx/Rx inactivity in the UE, or following a temporary transition from the first RRC state to the second RRC state to transmit a small data packet.

Following the trigger event, the UE 400 is configured with one or more additional paging occasions. The UE 400 may be configured with those additional paging occasions by a dedicated control signal transmitted by the gNB 402 to the UE 400 (not illustrated), or by system information broadcasted by the gNB 402 (e.g. at an earlier time). The dedicated control signal may relate to a transition of the UE 400 between RRC states (i.e. a control message instructing the UE 400 to transition to the first RRC state). The additional paging occasions may be configured with respect to configuration parameters comprising one of more of: a cycle length (i.e. measured in units of time, such as milliseconds, frames, or subframes etc) and how long the additional paging occasions are valid for (i.e. before the UE reverts to longer cell-configured paging cycles). The latter parameter is illustrated in FIG. 4 as "T", and may also be measured in units of time, or in numbers of cycles, for example.

Thus, for a period of time T following the trigger event, the UE 400 monitors one or more channels (e.g. a paging channel) for paging messages from the gNB 402 at periodic instances in time (e.g. periodic subframes of the channel(s)) configured by a paging cycle. It can be seen that the paging cycle for the additional paging occasions is shorter than the paging cycle for paging occasions that are otherwise configured for the UE 400 (e.g. paging cycles defined for the first RRC state). If DL data becomes available for the UE 400 within that window, the gNB 402 may utilize any of the additional paging occasions to transmit a suitable paging message to the UE 400 (e.g. so that it may wake from an RRC_Inactive state to an RRC_Connected state).

Upon expiry of the time T (e.g. upon expiry of a timer in the UE 400 configured with the value of T), the UE 400 reverts to a longer paging cycle, and monitors the one or more channels for paging messages less frequently.

Although FIG. 4 shows multiple shorter paging cycles during the time window T, it will be apparent that in some embodiments the window T and the paging cycle may be configured so that only a single additional paging occasion is possible before the UE 400 reverts to the longer paging cycle.

Figure 5:
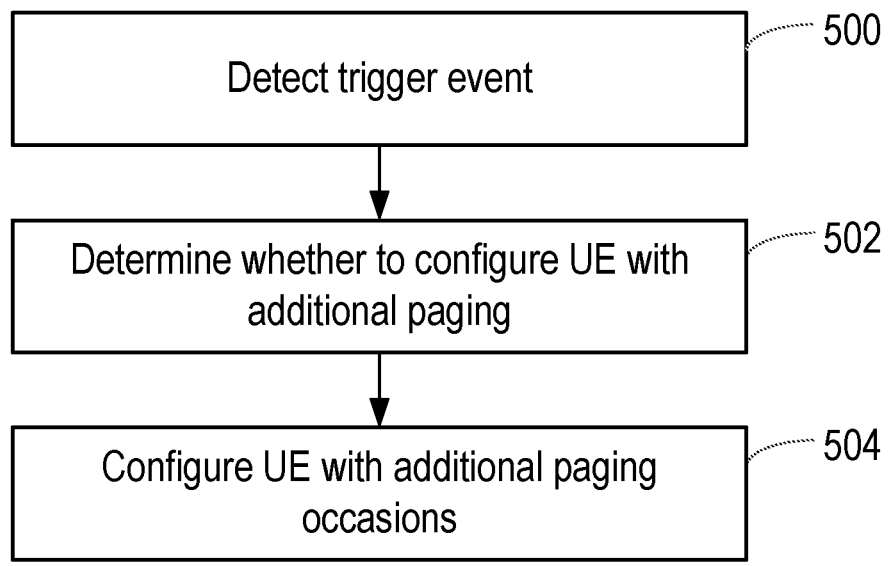
FIG. 5 is a flowchart of a method in a network node according to embodiments of the disclosure.

FIG. 5 is a flowchart of a method in a network node according to embodiments of the disclosure. The network node may be a radio access node (e.g. such as a NB, eNB, gNB etc), or a network node that is logically connected to and controls a radio access node (e.g. a network node in the core network, or in a remote computing environment (i.e. the cloud)).

In step 500, the network node detects a trigger event causing a wireless terminal device to be configured with additional paging occasions. The trigger event may be one of a plurality of trigger events that all cause the wireless terminal device to be configured with additional paging occasions. Alternatively, a single type of trigger event may cause the wireless terminal device to be configured with additional paging occasions.

For example, one or more trigger events may relate to a transition of the terminal device from a first RRC state or to the first RRC state (e.g. RRC_Inactive). One of the trigger events may comprise a transition of the terminal device from a second RRC state to the first RRC state (i.e. a transition from RRC_Connected to RRC_Inactive), e.g. due to Tx/Rx inactivity in the UE, or following a temporary transition from the first RRC state to the second RRC state to transmit a small data packet.

Optionally, in step 502, the network node determines whether to configure the wireless terminal device with additional paging occasions while it is in the first RRC state following the trigger event. The determination may comprise one of more of: determining whether further transmissions from the terminal device to the network node will occur within a time frame; and determining whether further transmissions to the terminal device from the network node will occur within a time frame.

For example, the network node may be able to predict, based on previous behaviour for the terminal device, that a previous small transmission of data is unlikely to trigger more activity in UL and/or DL. In this case, the network node may determine that no additional paging occasions are required. Alternatively, the network node may be able to predict, based on previous behaviour for the terminal device, that a previous small transmission of data is likely to trigger more activity in UL and/or DL. In this case, the network node may determine that additional paging occasions are required.

In step 504, the network node configures the wireless terminal device with additional paging occasions on which the wireless terminal device is to listen for paging messages from the network node. For example, the additional paging occasions may be configured with respect to a paging cycle (i.e. with one paging occasion per cycle). The additional paging cycles may be configured to be short (i.e. shorter than corresponding paging cycles that would otherwise be provided in the first RRC state) to reduce the possible delay in case there is DL traffic following the first UL transmission(s).

The additional paging occasions may be configured with respect to configuration parameters comprising one of more of: a cycle length (i.e. measured in units of time, such as milliseconds, frames, or subframes etc) and how long the additional paging occasions are valid for (i.e. before the UE reverts to longer cell-configured paging cycles). The latter parameter is illustrated in FIG. 4 as "T", and may also be measured in units of time, or in numbers of cycles, for example.

The network node may configure the wireless terminal device with one or more additional paging occasions by transmitting to the terminal device a dedicated control message indicating the additional paging occasions (e.g. a control signal related to the RRC state transitions), or by broadcasting system information indicating the additional paging occasions.

Figure 6:
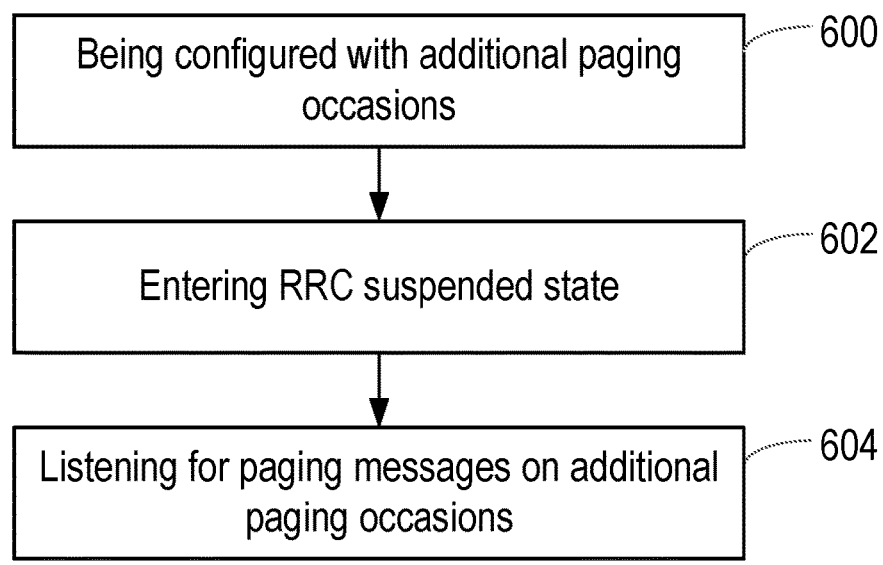
FIG. 6 is a flowchart of a method in a wireless terminal device according to embodiments of the disclosure.

FIG. 6 is a flowchart of a method in a wireless terminal device according to embodiments of the disclosure.

In step 600, wireless terminal device is configured with additional paging occasions on which the wireless terminal device is to listen for paging messages from the network node while in a first RRC state (e.g. the RRC_Inactive or a suspended RRC state). For example, the additional paging occasions may be configured with respect to a paging cycle (i.e. with one paging occasion per cycle). The additional paging cycles may be configured to be short (i.e. shorter than corresponding paging cycles that would otherwise be provided in the first RRC state) to reduce the possible delay in case there is DL traffic following a transition to the first RRC state.

The additional paging occasions may be configured with respect to configuration parameters comprising one of more of: a cycle length (i.e. measured in units of time, such as milliseconds, frames, or subframes etc) and how long the additional paging occasions are valid for (i.e. before the UE reverts to longer cell-configured paging cycles). The latter parameter is illustrated in FIG. 4 as "T", and may also be measured in units of time, or in numbers of cycles, for example.

The wireless terminal device may be configured with one or more additional paging occasions by receiving from a network node a dedicated control message indicating the additional paging occasions (e.g. a control signal related to the RRC state transition to or from the first RRC state), or by receiving the broadcast system information indicating the additional paging occasions, for example.

In step 602, the wireless terminal device enters the first RRC state (e.g. the RRC_Inactive state or an RRC suspended state). For example, an inactivity timer may have expired since the wireless terminal device last received or transmitted any signal (e.g. a data transmission), or the wireless terminal device may have transitioned from the first RRC state to a second RRC state, in order to transmit a small data packet, and then reverted to the first RRC state either autonomously or under the instruction of a network node.

In step 604, at the additional paging occasions configured in step 604, the wireless terminal device listens for paging messages from a network node (e.g. its serving network node) on one or more channels (e.g. a paging channel). After expiry of the time window in which the additional paging occasions apply, the terminal device may revert to a longer paging cycle configured for the first RRC state.

Figure 7:
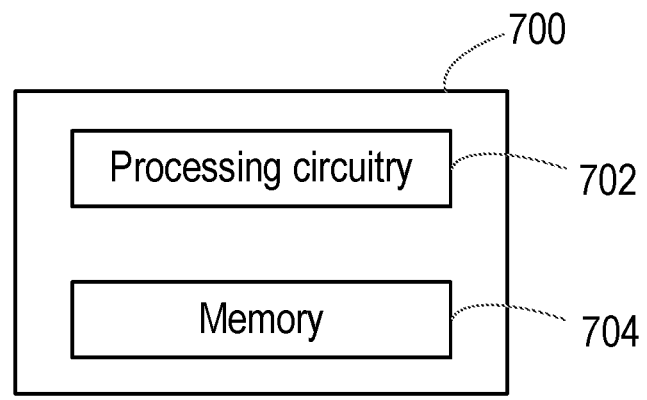
FIG. 7 is a schematic diagram of a network node according to embodiments of the disclosure.

FIG. 7 is a schematic diagram of a network node 700 according to embodiments of the disclosure, which may be suitable for carrying out the method shown in FIG. 5.

The network node 700 may be suitable for use in a wireless communications network further comprising a terminal device, with the terminal device being configurable in a plurality of radio resource control (RRC) states, the plurality of RRC states comprising a first RRC state in which the terminal device is configured with first paging occasions to listen for paging messages from the network node 700. The network node 700 comprises processing circuitry 702 and a computer-readable medium 704 (such as memory). The computer-readable medium 704 stores code that, when executed by the processing circuitry 702, causes the network node 700 to: configure the terminal device with one or more second paging occasions for the terminal device to listen for paging messages from the network node, in addition to the first paging occasions, while the terminal device is in the first RRC state.

In some embodiments, the network node 700 may additionally comprise transceiver circuitry and one or more antennas for transmitting or receiving wireless transmissions.

Figure 8:
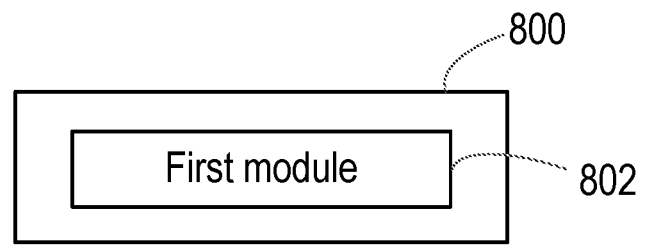
FIG. 8 is a schematic diagram of a network node according to further embodiments of the disclosure.

FIG. 8 is a schematic diagram of a network node 800 according to further embodiments of the disclosure, which may be suitable for carrying out the method shown in FIG. 5, for example.

The network node 800 may be suitable for use in a wireless communications network further comprising a terminal device, with the terminal device being configurable in a plurality of radio resource control (RRC) states, the plurality of RRC states comprising a first RRC state in which the terminal device is configured with first paging occasions to listen for paging messages from the network node 800. The network node 800 comprises a first module 802 operable to configure the terminal device with one or more second paging occasions for the terminal device to listen for paging messages from the network node, in addition to the first paging occasions, while the terminal device is in the first RRC state.

In some embodiments, the network node 800 may additionally comprise a transceiver module and one or more antennas for transmitting or receiving wireless transmissions.

Figure 9:
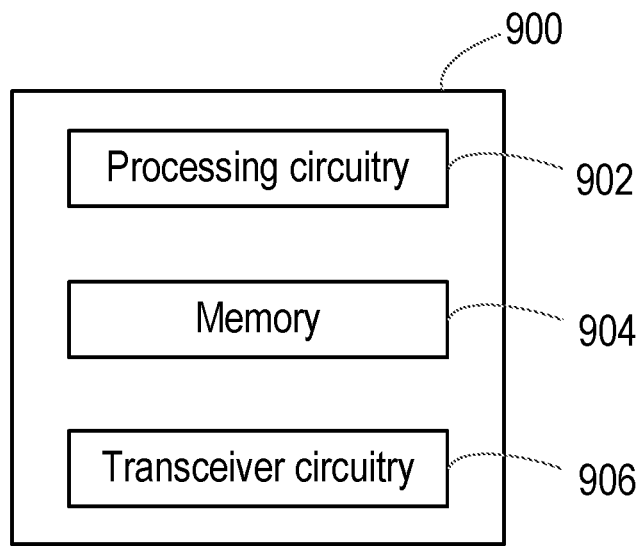
FIG. 9 is a schematic diagram of a wireless terminal device according to embodiments of the disclosure.

FIG. 9 is a schematic diagram of a wireless terminal device 900 according to embodiments of the disclosure, which may be suitable for carrying out the method shown in FIG. 6, for example.

The wireless terminal device 900 may be suitable for use in a wireless communications network further comprising a network node. The terminal device may be configurable in a plurality of radio resource control (RRC) states, the plurality of RRC states comprising a first RRC state in which the terminal device is configured with first paging occasions to listen for paging messages from the network node. The terminal device comprises processing circuitry 902 and a computer-readable medium 904 (such as memory). The computer-readable medium 904 stores code that, when executed by the processing circuitry 902, causes the terminal device to: be configured with one or more second paging occasions; and while in the first RRC state, listen for paging messages from the network node during the one or more second paging occasions in addition to the first paging occasions.

In some embodiments, the wireless terminal device 900 additionally comprises transceiver circuitry 906 and one or more antennas for transmitting or receiving wireless transmissions.

Figure 10:
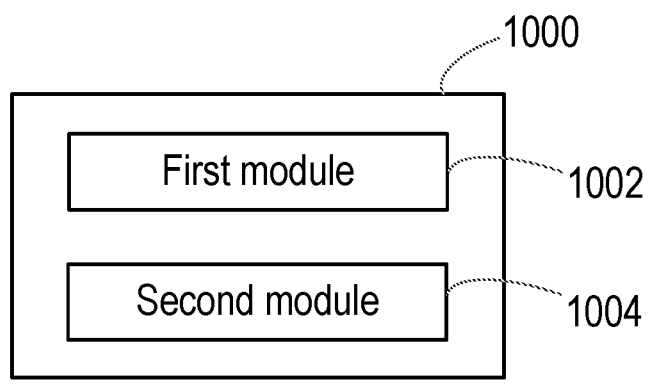
FIG. 10 is a schematic diagram of a wireless terminal device according to further embodiments of the disclosure.

FIG. 10 is a schematic diagram of a wireless terminal device 1000 according to further embodiments of the disclosure, which may be suitable for carrying out the method shown in FIG. 6, for example.

The wireless terminal device 1000 may be suitable for use in a wireless communications network further comprising a network node. The wireless terminal device 1000 may be configurable in a plurality of radio resource control (RRC) states, the plurality of RRC states comprising a first RRC state in which the terminal device is configured with first paging occasions to listen for paging messages from the network node. The terminal device comprises a first module 1002 operable be configured with one or more second paging occasions; and a second module 1004 operable to, while the terminal device 1000 is in the first RRC state, listen for paging messages from the network node during the one or more second paging occasions in addition to the first paging occasions.

In some embodiments, the wireless terminal device 1000 may additionally comprise a transceiver module and one or more antennas for transmitting or receiving wireless transmissions.

Figure 11:
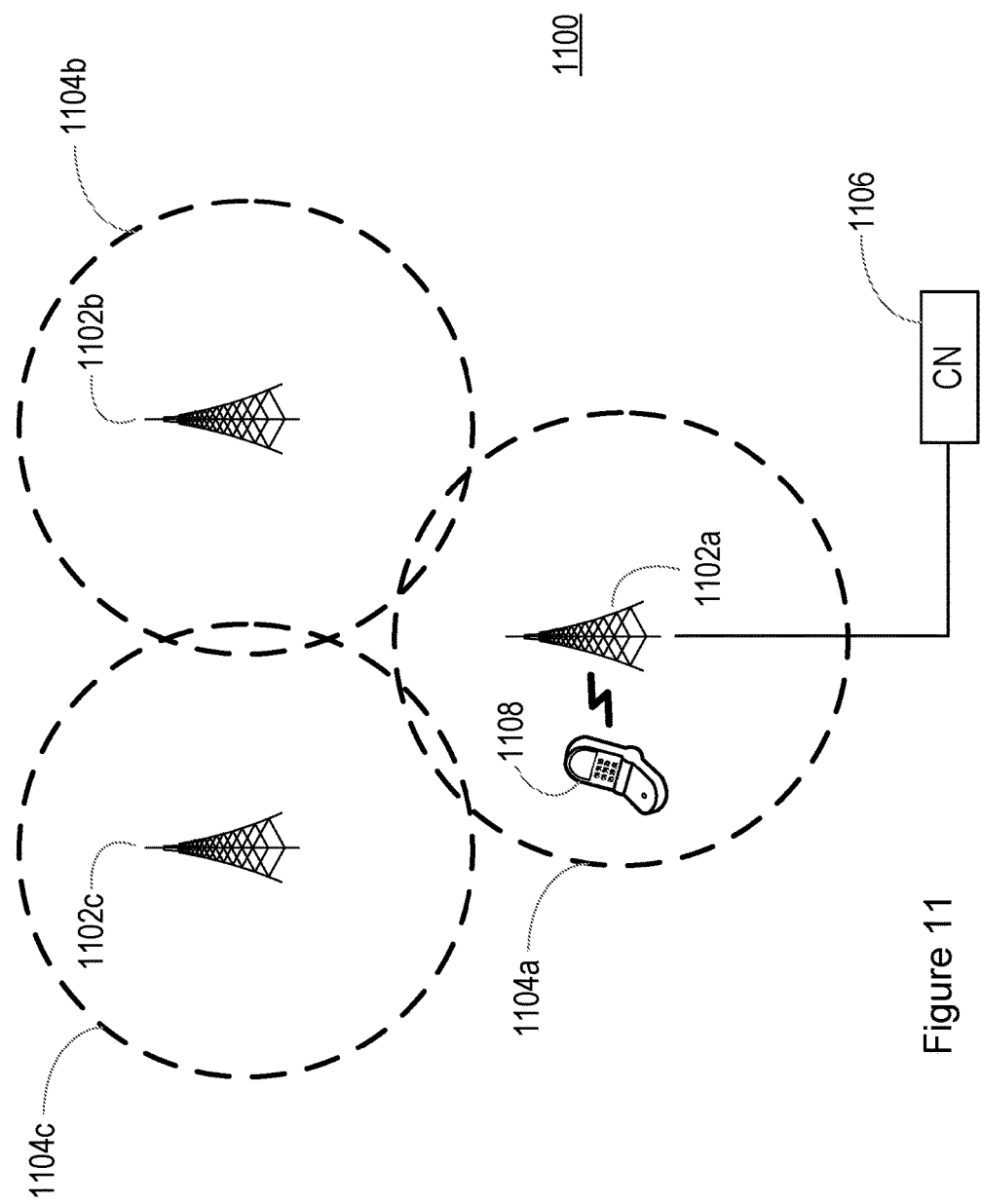
FIG. 11 shows a wireless communication network according to embodiments of the disclosure.

FIG. 11 shows a wireless communication network 1100 according to embodiments of the disclosure. The network 1100 comprises a plurality of radio access nodes 1102*a*, 1102*b*, 1102*c*, each serving one or more respective cells 1104*a*, 1104*b*, 1104*c*. The network 1100 further comprises a core network 1106 to which each of the radio access nodes is connected (although for clarity the Figure explicitly shows only a connection between the core network 1106 and radio access node 1102*a*). A wireless terminal device 1108 (also known as a UE) is camped on the cell 1104*a*, and is served by the radio access node 1102*a*.

The cellular network 1100 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 1100 may be suitable for providing radio communications meeting one or more of the criteria established by the Next Generation Mobile Networks Alliance for the 5th generation of mobile telecommunications standards.

Figure 12:
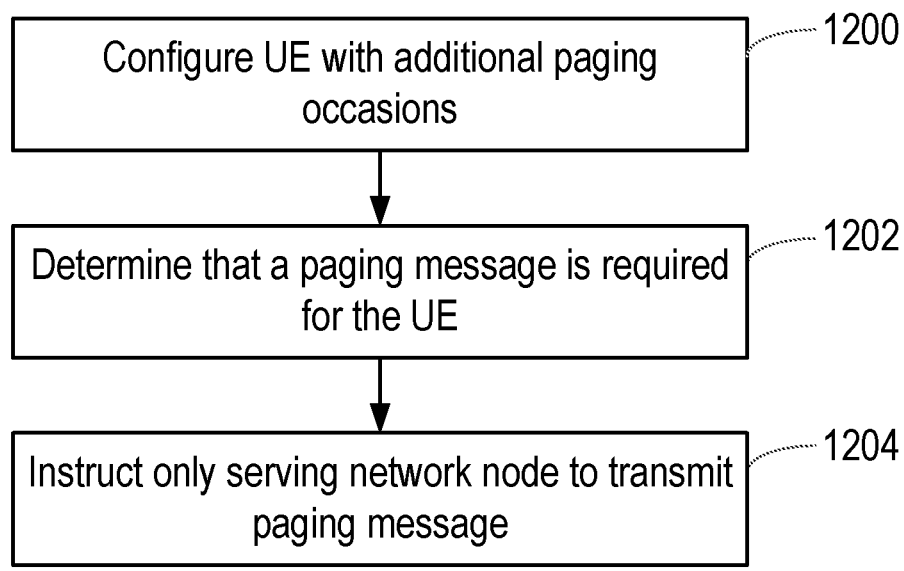
FIG. 12 shows a method in a node of a wireless communication network according to embodiments of the disclosure.

FIG. 12 shows a method in a node of the wireless communication network 1100 according to embodiments of the disclosure. The node may be a radio access node, such as one of the radio access nodes 1102a, 1102b, 1102c, or a node that is logically connected to such a radio access node (such as a node in the core network or a node in a remote computing environment coupled to the radio access nodes through the core network 1106).

In step 1200, the node configures the wireless terminal device 1108 with additional paging occasions for use while the terminal device 1108 is in a first RRC state (e.g. an RRC_Inactive state or an RRC suspended state), on which the wireless terminal device is to listen for paging messages from its radio access node. For example, the additional paging occasions may be configured with respect to a paging cycle (i.e. with one paging occasion per cycle). The additional paging cycles may be configured to be short (i.e. shorter than corresponding paging cycles that would otherwise be provided in the first RRC state) to reduce the possible delay in case there is DL traffic following a transition to the first RRC state.

The additional paging occasions may be configured with respect to configuration parameters comprising one of more of: a cycle length (i.e. measured in units of time, such as milliseconds, frames, or subframes etc) and how long the additional paging occasions are valid for (i.e. before the UE reverts to longer cell-configured paging cycles). The latter parameter is illustrated in FIG. 4 as "T", and may also be measured in units of time, or in numbers of cycles, for example.

The node may configure the wireless terminal device with one or more additional paging occasions by transmitting to the terminal device a dedicated control message indicating the additional paging occasions (e.g. a control signal related to the RRC state transitions), or by broadcasting system information indicating the additional paging occasions, or by instructing the radio access node 1102a to transmit such a dedicated control message or such a broadcast system information.

In step 1202, while the wireless terminal device 1108 is configured with the additional paging occasions (e.g. within the limited time window in which the additional paging occasions apply), the node determines that a paging message is required for the wireless terminal device 1108. For example, the network may have DL data to be transmitted to the terminal device 1108.

In step 1204, according to embodiments of the disclosure, a paging message is transmitted to the wireless terminal 1108 using one or more of the one or more additional paging occasions, by only the radio access node 1102a with which the device was communicating immediately prior to its transition to the first RRC state, e.g. its serving radio access node. Thus the network node may instruct only the radio access node 1102a to transmit such a paging message. Other radio access nodes 1102b, 1102c do not, and are not instructed to, transmit paging messages for the wireless terminal device as it may be assumed that the device has not had time to move to a different cell in the relatively short time window while the additional paging occasions are configured. Thus, in this embodiment, the resources required for paging of the terminal device are reduced.

The invention makes it possible to reduce the delay for DL traffic as triggered by an UL small data transmission while the UE is in an inactive mode, or following a transition to the inactive mode from a connected mode. This makes it possible for the network more often to move UEs back to inactive mode (which is beneficial when it is difficult to predict if there will be DL traffic, e.g. as a response to the UL small data transmission).

Thus, there are described methods that deal with issues relating to paging in a wireless communications network, and particularly the paging of a device that has recently entered an RRC_Inactive or suspended state, or transitioned from that state in order to transmit a small data transmission.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

The invention claimed is:

1. A method in a network node of a wireless communications network, the wireless communications network further comprising a terminal device the terminal device being configurable in a plurality of radio resource control (RRC) states, the plurality of RRC states comprising a first RRC state in which the terminal device is configured with first paging occasions to listen for paging messages from the network node, the method comprising:

configuring the terminal device with one or more second paging occasions for the terminal device to listen for paging messages from the network node, in addition to the first paging occasions, while the terminal device is in the first RRC state, responsive to one or more trigger events relating to a transition of the terminal device one of from the first RRC state to a second RRC state and from the second RRC state to the first RRC state, the configuring comprising one taken from the group consisting of broadcasting system information indicating the second paging occasions; and transmitting to the terminal device a dedicated control message indicating the second paging occasions, the dedicated control message further relating to a transition one of from the first RRC state and to the first RRC state.

2. The method according to claim 1, wherein the first paging occasions are defined according to a first paging cycle, and wherein the second paging occasions are defined according to a second paging cycle, wherein the second paging cycle is shorter than the first paging cycle.

3. The method according to claim 1, wherein the terminal device is configured with second paging occasions during a time window.

4. The method according to claim 1, wherein the at least one trigger event comprises receiving a data transmission from the terminal device during a temporary transition from the first RRC state to a second RRC state.

5. The method according to claim 4, wherein the data transmission comprises a small data transmission.

6. The method according to claim 4, wherein the second RRC state is an RRC connected state.

7. The method according to claim 1, wherein the first RRC state is one of an RRC suspended state and an RRC inactive state.

8. A method in a terminal device of a wireless communications network, the wireless communications network further comprising a network node, the terminal device being configurable in a plurality of radio resource control (RRC) states, the plurality of RRC states comprising a first RRC state in which the terminal device is configured with first paging occasions to listen for paging messages from the network node, the method comprising:
being configured with one or more second paging occasions responsive to one or more trigger events relating to a transition of the terminal device one of from the first RRC state to a second RRC state and from the second state to the first RRC state, being configured with one or more second paging occasions comprising one taken from the group consisting of receiving system information from the network node indicating the second paging occasions, and receiving from the network node a dedicated control message indicating the second paging occasions; and
while in the first RRC state, listening for paging messages from the network node during the one or more second paging occasions in addition to the first paging occasions, the dedicated control message further relating to a transition of the terminal device one of from the first RRC state and to the first RRC state.

9. The method according to claim 8, wherein the first paging occasions are defined according to a first paging cycle, and wherein the second paging occasions are defined according to a second paging cycle, wherein the second paging cycle is shorter than the first paging cycle.

10. The method according to claim 8, wherein the terminal device is configured with one or more second paging occasions during a time window.

11. The method according to claim 8, wherein the at least one trigger event comprises transmitting a data transmission during a temporary transition from the first RRC state to the second RRC state.

12. The method according to claim 11, wherein the data transmission comprises a small data transmission.

13. The method according to claim 11, wherein the second RRC state is an RRC connected state.

14. The method according to claim 8, wherein the first RRC state is one of an RRC suspended state and an RRC inactive state.

15. A method in a wireless communication network, the wireless communication network comprising a first network node and a terminal device, the terminal device being configurable in a plurality of radio resource control (RRC) states, the plurality of RRC states comprising a first RRC state in which the terminal device is configured with first paging occasions to listen for paging messages from the first network node, the method comprising:
configuring the terminal device with one or more second paging occasions for the terminal device to listen for paging messages from the first network node, in addition to the first paging occasions, while the terminal device is in the first RRC state responsive to one or more trigger events relating to a transition of the terminal device one of from the first RRC state to a second RRC state and from the second RRC state to the first RRC state, the at least one trigger event comprising receiving a data transmission from the terminal device during a temporary transition from the first RRC state to the second RRC state, the data transmission comprising a small data transmission.

16. The method according to claim 15, wherein the wireless communication network comprises a plurality of network nodes to which the first network node belongs, each network node serving one or more respective cells, the method further comprising:
while the terminal device is configured with the one or more second paging occasions, instructing only the first network node to transmit a paging message for the terminal device.

17. The method according to claim 15, wherein the first paging occasions are defined according to a first paging cycle, and wherein the second paging occasions are defined according to a second paging cycle, wherein the second paging cycle is shorter than the first paging cycle.

18. The method according to claim 15, wherein the terminal device is configured with second paging occasions during a time window.

19. A network node for a wireless communications network, the wireless communications network further comprising a terminal device, the terminal device being configurable in a plurality of radio resource control (RRC) states, the plurality of RRC states comprising a first RRC state in which the terminal device is configured with first paging occasions to listen for paging messages from the network node, the network node comprising processing circuitry and a computer-readable medium, the computer-readable medium storing code that, when executed by the processing circuitry, causes the network node to:
configure the terminal device with one or more second paging occasions for the terminal device to listen for paging messages from the network node, in addition to the first paging occasions, while the terminal device is in the first RRC state, responsive to at least one trigger event relating to a transition of the terminal device one of from the first RRC state to a second RRC state and from the second RRC state to the first RRC state, the at least one trigger event comprising receiving a data transmission from the terminal device during a temporary transition from the first RRC state to the second RRC state, the data transmission comprising a small data transmission.

20. A terminal device for a wireless communications network, the wireless communications network comprising a network node, wherein the terminal device is configurable in a plurality of radio resource control (RRC) states, the plurality of RRC states comprising a first RRC state in which the terminal device is configured with first paging occasions to listen for paging messages from the network node, the terminal device comprising processing circuitry and a computer-readable medium, the computer-readable medium storing code that, when executed by the processing circuitry, causes the terminal device to:
be configured with one or more second paging occasions responsive to at least one trigger event relating to a transition of the terminal device one of from the first RRC state to the second RRC state and from the second RRC state to the first RRC state, the at least one trigger event comprising transmitting a data transmission during a temporary transition from the first RRC state to the second RRC state, the data transmission comprising a small data transmission; and
while in the first RRC state, listen for paging messages from the network node during the one or more second paging occasions in addition to the first paging occasions.

21. The terminal device according to claim 20, wherein the first paging occasions are defined according to a first paging cycle, and wherein the second paging occasions are defined according to a second paging cycle, wherein the second paging cycle is shorter than the first paging cycle.

22. The terminal device according to claim 20, wherein the terminal device is configured with one or more second paging occasions during a time window.

23. The terminal device according to claim 20, wherein the at least one trigger event comprises a transition of the terminal device from the second RRC state to the first RRC state.

24. The terminal device according to claim 23, wherein the terminal device transitions from the second RRC state to the first RRC state due to transmit/receive inactivity in the terminal device.

* * * * *